United States Patent [19]

Shinjo et al.

[11] Patent Number: 5,412,641
[45] Date of Patent: May 2, 1995

[54] INFORMATION RECORDING/REPRODUCING APPARATUS FOR RECORDING/REPRODUCING INFORMATION WITH PROBES

[75] Inventors: Katsuhiko Shinjo, Isehara; Toshihiko Miyazaki, Hiratsuka; Ryo Kuroda, Machida; Keisuke Yamamoto, Yamato; Toshimitsu Kawase, Ayase, all of Japan

[73] Assignee: Canon Kabushiki Kaisha, Tokyo, Japan

[21] Appl. No.: 55,088

[22] Filed: May 3, 1993

[30] Foreign Application Priority Data

May 7, 1992 [JP] Japan .................... 4-114959

[51] Int. Cl.$^6$ ............................................. G11B 9/00
[52] U.S. Cl. ........................................................ 369/126
[58] Field of Search ............... 250/306, 307; 369/126, 369/100, 101

[56] References Cited

U.S. PATENT DOCUMENTS 4,668,865 5/1987 Gimzewski et al. .......... 250/306
4,831,614 5/1989 Duerig et al. ................. 250/306

FOREIGN PATENT DOCUMENTS 62-281138 12/1987 Japan .
63-161552 7/1988 Japan .
63-161553 7/1988 Japan .

Primary Examiner—Paul M. Dzierzynski
Assistant Examiner—Don Wong
Attorney, Agent, or Firm—Fitzpatrick, Cella, Harper & Scinto

[57] ABSTRACT

An information recording and/or reproducing apparatus performs at least one of record and reproduction of information on an information record medium with a plurality of probes. The apparatus includes a support plate supporting the plurality of probes and segmented into a plurality of blocks, and a driving mechanism for driving the plurality of blocks independently of one another. Another apparatus may include an information record medium segmented into a plurality of blocks, a support plate supporting a plurality of probes, and a driving mechanism for driving the plurality of blocks independently of one another.

7 Claims, 4 Drawing Sheets

INFORMATION RECORDING/REPRODUCING APPARATUS FOR RECORDING/REPRODUCING INFORMATION WITH PROBES

BACKGROUND OF THE INVENTION

1. Field of the Invention

The present invention relates to an information recording and/or reproducing apparatus with high density and large capacity using the principle of scanning tunnel microscope.

2. Related Background Art

Recently, memory devices and the memory systems have found diverse use in computers and associated instruments, for example the video disk and the digital audio disk, and are becoming the core of the electronics industry.

Magnetic memories and semiconductor memories have been the majority of conventional memory devices, but optical memory devices using an inexpensive high density record medium are now being developed with recent progress of laser technology. It is desired to realize a memory device or recording/reproducing apparatus having a larger memory capacity even in smaller volume in the prospect of computer use at home and information industrialization mainly of image.

In the meantime, there has recently been developed a scanning tunnel microscope (as will be referred to as STM) which permits direct observation of the electronic structure in the surface atom of a conductor. Using the STM, measurement can be done at a high resolution in real space irrespective of whether a sample is a single crystal or an amorphous material. The STM has an advantage that observation may be performed in low power and without any damage on a material to be measured, because it uses the method of detecting a micro current. Further, the STM can be operated in air or in solution as well as in super high vacuum, so that it is available for measurement of various materials and expected to be applied in various fields.

An example of applications is a study on a recording apparatus for writing information at a high resolution in a sample and a reproducing apparatus for reading information written in the sample at a high resolution, for example as described in Japanese Laid-open Patent Application Nos. 63-161552 and 63-161553.

The apparatus uses the same probe as the STM, and performs recording by applying a pulse voltage between the probe and a record medium to locally change the conductivity. The record medium employed may be a material that exhibits switching characteristics with memory function with respect to volt-ampere characteristic, for example thin film layers of chalcogenides and $\pi$-electron organic compounds. The reproduction may be conducted by detecting a change of tunnel resistance between a region thus recorded and the non-recorded region. The record medium for this recording method could be one which changes its surface shape upon application of voltage on the probe, similarly effecting recording or reproduction of information.

The apparatus employing such STM technology performs the observation while the probe electrode and the record medium are brought close to each other up to about 1 nm. Therefore, the distance must be controlled in the order of angstrom between the probe and the record medium. Further, in recording or reproducing information pieces arranged in two-dimensional matrix, two-dimensional scan of probes must be controlled in the order of several ten angstroms.

There is a proposal to simultaneously drive numerous probes (in multiple probe arrangement), enhancing a functional improvement of recording or reproducing, especially with respect to high speed processing. In such an arrangement a relative position between each probe and the record medium must be three-dimensionally controlled at the above-stated accuracies in an area in which the numerous probes are arranged. This control is conventionally effected by using a laminated piezo-electric device or a cylindrical piezo-electric device provided on the probe side or on the record medium side. These devices can ensure a large displacement amount, but are not suitable for integrated arrangement. Thus, the devices are not readily used in the recording/reproducing apparatus of multiple probe type. A solution to such a problem is disclosed in Japanese Laid-open Patent Application No. 62-281138, in which each probe is mounted on a cantilever (one-side-supported beam) with length of several hundred $\mu$m and the cantilever is driven by a piezo-electric force or by an electrostatic force.

However, the information recording and/or reproducing apparatus of an STM structure with a plurality of probe electrodes needs to control the distance between each probe electrode and the record medium precisely in the order of angstrom, and has a big problem of thermal drift due to thermal expansion in the arrangement requiring a face aligning mechanism between the surface of the record medium and the surface including the tips of the plural probe electrodes.

The thermal drift would be a big hindrance in fabrication or use of a high density and large capacity recording and/or reproducing apparatus. Supposing a plurality of probes are disposed on a plane of 1 cm square and if there is a temperature difference of 1° C. between the probe side and the record medium, a relative position would change by about 0.1 $\mu$m on a two-dimensional plane between the probes and the record medium. In application as the recording and/or reproducing apparatus, such a positional change causes a tracking error, a reading error, or the like, resulting in a fatal defect. It is considered that a precise temperature control may be carried out using a Peltier element or the like to prevent the thermal drift. This arrangement, however, makes the thus produced apparatus complicated and expensive.

SUMMARY OF THE INVENTION

The present invention has been accomplished taking into account the problems as seen in the conventional techniques, and it is, therefore, an object of the present invention to realize an information recording and/or reproducing apparatus which can reduce influence of thermal drift while being low in production cost but high in reliability.

The above object can be achieved by an information recording and/or reproducing apparatus which performs at least one of record and reproduction of information in an information record medium with a plurality of probes, comprising:
  a support plate supporting said plurality of probes and segmented into a plurality of blocks; and
  driving means for driving said plurality of blocks independently of one another.

Also, the object can be achieved by an information recording and/or reproducing apparatus which performs at least one of record and reproduction of information in an information record medium with a plurality of probes, comprising:
  an information record medium segmented into a plurality of blocks;
  a support plate supporting said plurality of probes; and
  driving means for driving said plurality of blocks independently of one another.

Further, the object can be achieved by an information recording and/or reproducing apparatus which performs at least one of record and reproduction of information in an information record medium with a plurality of probes, comprising:
  an information record medium segmented into a plurality of blocks;
  a support plate supporting said plurality of probes and segmented into a plurality of blocks;
  first driving means for driving the plurality of blocks of said information record medium independently of one another; and
  second driving means for driving the plurality of blocks of said support plate independently of one another.

In the arrangement of the present invention the probe support plate or the record medium is segmented into plural blocks respectively provided with driving means, so that even if the thermal drift is caused by thermal expansion so as to change the relative position between the probe support plate and the record medium a sure reading operation or writing operation may be executed by moving the blocks independently of one another.

It is important in the present invention to change the relative position between the record medium and the probes in the plane parallel to the record medium, but the driving means for each block does not always have to have a moving mechanism of relative position between the record medium and the probes in the direction perpendicular to the record medium. In case that a perpendicular moving mechanism is provided, any force such as an electrostatic force, a piezo-electric force, and a magnetic force may be used as a driving force, which may be applied to move either the record medium or the probes, or both, as described.

The information recording and/or reproducing apparatus of the present invention performs record or reproduction of information by changing or detecting a physical quantity concerning the record medium through the probes. The physical quantity may be any quantity, for example a tunnel current, a surface electronic state, a shape, etc. In other words, the apparatus may be one utilizing the scan of probes, as for example in the scanning tunnel microscope, the interatomic force microscope, the magnetic force microscope, etc.

DETAILED DESCRIPTION OF THE PREFERRED EMBODIMENTS

The preferred embodiments of the present invention will be described in detail with reference to the accompanying drawings.

Figure 1:
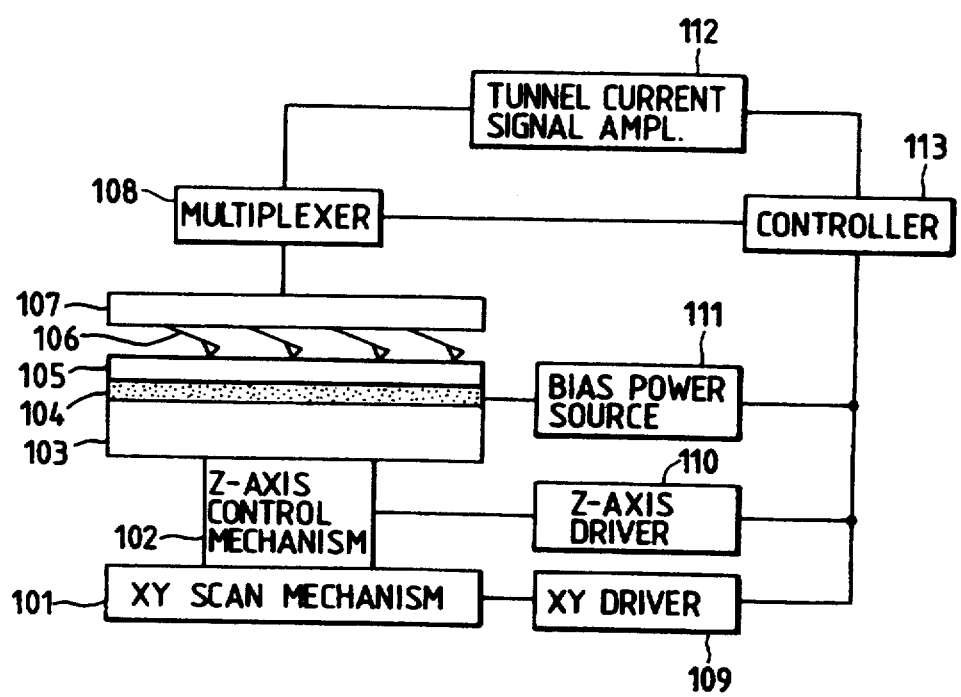
FIG. 1 is a drawing to show the structure of an information recording and/or reproducing apparatus according to the present invention.

FIG. 1 is a drawing to show a basic construction of the information recording and/or reproducing apparatus according to the present invention.

The information recording and/or reproducing apparatus as shown in FIG. 1 employs the STM structure. In FIG. 1 reference numeral 101 denotes an XY scan mechanism, 102 a Z-axis control mechanism, 103 a substrate, 104 an electrode, 105 a record medium, 106 probes, 107 a probe support plate, 108 a multiplexer for switching signals from the plural probes, 109 an XY driver, 110 a Z-axis driver, 111 a bias power source, and 112 a tunnel current signal amplifier. The multiplexer 108, the XY driver 109, the Z-axis driver 110, the bias power source 111, and the signal amplifier 112 are generally controlled by a controller 113.

Figure 2:
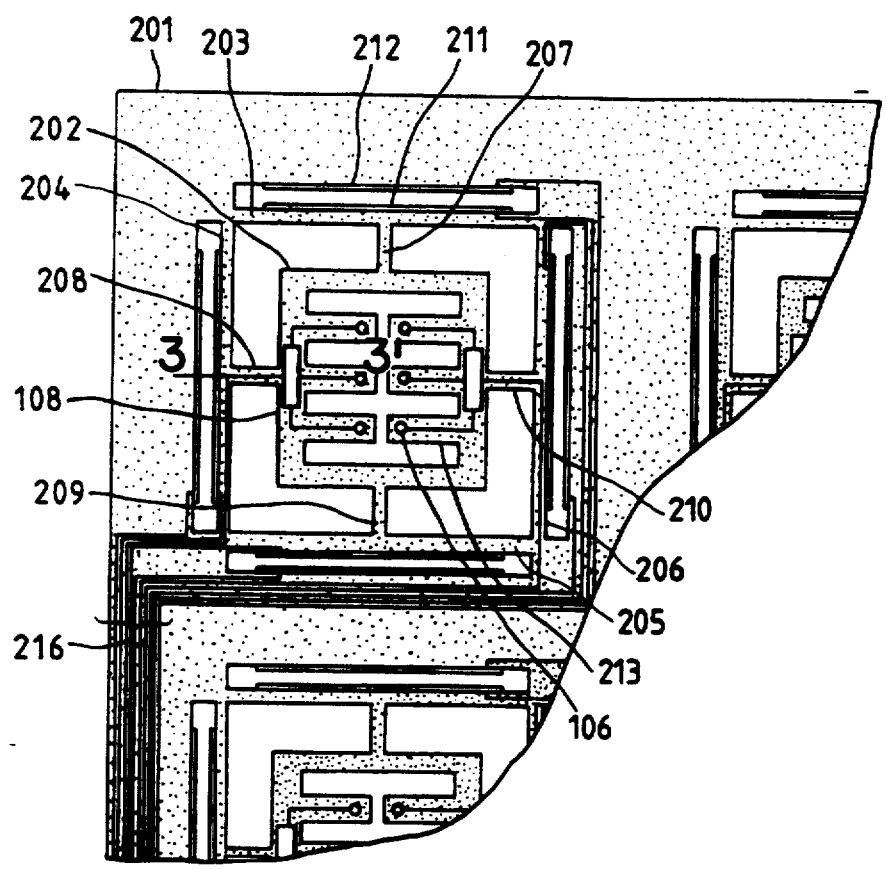
FIG. 2 is a fragmentary plan view of a probe support plate in the apparatus as shown in FIG. 1.

FIG. 2 is a fragmentary plan view of the probe support plate 107.

There are nine blocks in total arranged in a matrix of $3 \times 3$ on a Si substrate 201 in size of 1 cm $\times$ 1 cm, which are arranged to be capable of being two-dimensionally driven relative to the Si substrate 201. FIG. 2 shows only one block 202 out of the nine blocks. Each block is sized 500 $\mu$m $\times$ 500 $\mu$m. The block 202 is supported by hinges 203, 204, 205, 206 surrounding the block 202 and by hinges 207, 208, 209, 210 formed to connect the block 202 with each central portion of hinge 203, 204, 205, 206.

The hinge 203 constitutes driving means together with an electrode 211 formed on a side of a gap on the block 202 side and with an electrode 212 formed on another side of gap on the Si substrate 201 side, and the block 202 is deformed by an electrostatic force when a voltage is applied between the electrodes 211 and 212 (separated by the gap of 10 $\mu$m). Deformation of each of the other hinges 204, 205, 206 is essentially the same as that of the hinge 203. The deformations are independently controlled by the controller 113 for each block. Each of the hinges 203, 204, 205, 206 is sized in length of 800 $\mu$m, in width of 15 $\mu$m, and in thickness of 0.5 mm, and each of the hinges 207, 208, 209, 210 is sized in length of 200 $\mu$m, in width of 15 $\mu$m, and in thickness of 1 $\mu$m. Applying a voltage of 0–50 V between the electrodes 211 and 212, the block 202 was moved in $\pm 0.5$ $\mu$m by displacement of the hinges. When the block 202 is moved by displacing the hinges, two hinges opposing each other with the block 202 between them should be preferably displaced in the same direction to prevent the block 202 from having a strain. A value of voltage applied to the electrodes at each hinge may be suitably determined taking this into account.

Six cantilevers 213 are formed on the block 202, on each of which a probe 106 is provided for detecting a tunnel current. Each of the cantilevers 213 is sized in length of 220 $\mu$m, in width of 80 $\mu$m, and in thickness of 1 $\mu$m.

Tunnel currents detected by the six probes 106 formed on the block 202 are fed to the multiplexer circuit 108, and the multiplexer 108 selects only tunnel current signals from a block to be read and supplies the signals through wiring 216 to the controller 113 (as shown in FIG. 1), where read information is checked.

The entire production process of the above components employs that of Si IC including the photolithography, the anisotropic etching of Si single crystal, and so on. Therefore, the components were able to be made at high precision and in good productivity.

Figure 3:
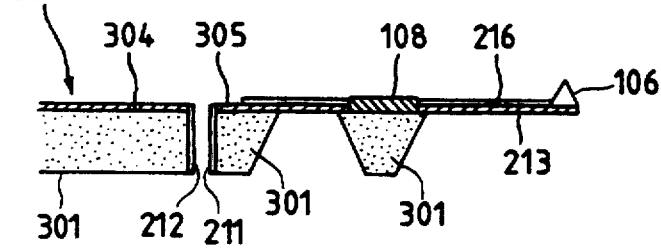
FIG. 3 is a cross sectional view along the 3—3' line in FIG. 2.

FIG. 3 is a cross sectional view along the 3—3' line in FIG. 2.

A Si wafer 301 has the (100) orientation, and SiN films 304, 305 are formed on the Si wafer 301 in thickness of 1 μm by the CVD method, forming the Si substrate 201. Ag is deposited on a tip of each cantilever 213 to form a probe 106 for detecting a tunnel current. Each probe 106 is connected through the wiring 216 to the multiplexer circuit 108 made on the Si wafer 301. The electrodes 211, 212 for electrostatic drive are formed facing each other on side walls substantially perpendicular to the upper surface of Si substrate 201 in the portion of Si substrate 201 forming each hinge. The cantilevers 213 as described have no actuating portion and the cantilevers 213 are brought into a contact with a record medium in recording and/or reproducing, using the elasticity of the cantilever 213.

Now described is a relative displacement between the cantilevers 213 and the record medium. As for the vertical displacement in the Z-direction, that is, in the direction perpendicular to the record medium 105 (see FIG. 1), a coarse movement is performed using the Z-axis control mechanism 102 as shown in FIG. 1. More specifically, the record medium 105 is driven by a cylindrical piezo-electric device (not shown) arranged above the XY scan mechanism 101 in FIG. 1. A fine movement is carried out by the passive drive using the elasticity of cantilevers 213.

The XY scan mechanism 101 as shown in FIG. 1 is used to effect the movement in the X and Y directions, that is, to effect scanning and tracking in the direction of plane of record medium. Specifically, a stainless steel frame on which the record medium 105 is mounted is driven by a laminated piezo-electric device (not shown).

The record medium 105 used in the present embodiment was made such that Au was evaporated on a glass substrate and four layers of polyimide LB film were then built up in thickness of about 15 Å over the Au layer. In this arrangement, when a pulse voltage was applied between a probe 216 on a cantilever 213 and the Au layer of undercoat in record medium 105, the electrical resistivity of record medium changed approximately two figures, and the change state of electric resistivity was maintained so as to enable information recording. The change area of electrical resistivity had a very small size of 100 Å × 100 Å, enabling super high density recording.

After that, reproduction was carried out using the same probe 106 as in recording. A bias voltage of lower voltage value than the pulse voltage in recording was applied between the probe 106 and the Au layer in the above record medium 105, and a change in tunnel current was read between the probe and the Au layer to detect a portion different in electrical resistivity on the record medium 105, whereby it was confirmed that information record and reproduction could be effected by the same probe.

The following experiment was carried out to check whether the influence of drift due to a temperature change could be removed. Fifty four probes on the Si substrate 201 were operated in parallel at an ambient temperature of 20° C. to write information as record bit trains by the above-described method.

Figure 4:
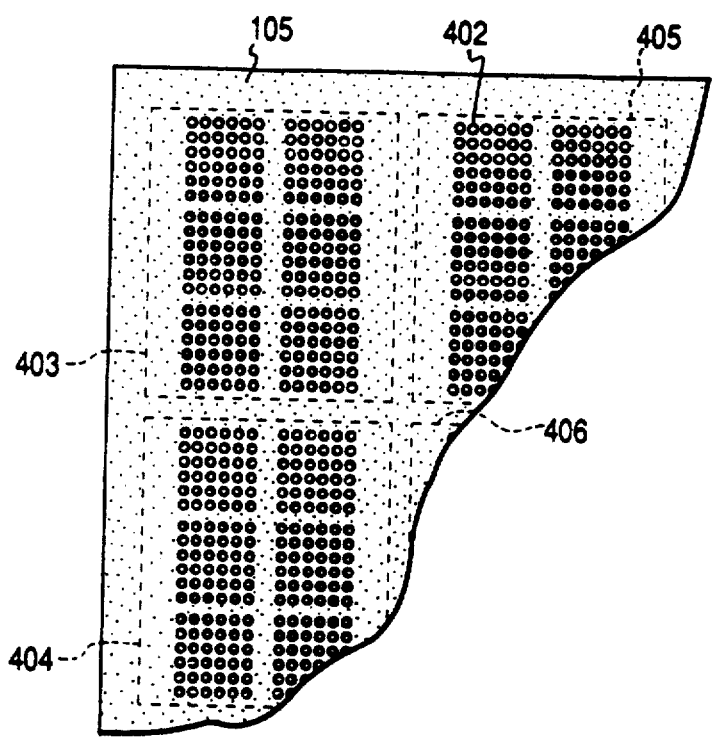
FIG. 4 is a drawing to show recorded bit strings formed on a record medium as shown in FIG. 1.

FIG. 4 is a drawing to schematically show the state of record bit trains formed on the record medium 105 in the writing as described above.

In FIG. 4, numeral 402 denotes a record bit, and numerals 403, 404, 405, 406, and so on record areas recorded by the respective blocks. Then, information reading was carried out using the record bits at ambient temperature of 25° C. in the above method. Out of the fifty four probes, a probe in the left upper block was set as a reference, and two-dimensional positioning was carried out between the record medium 105 and the probes 106 by totally driving the probe support plate 107 by the XY scan mechanism 101. A deviation amount caused by temperature drift in the record area 403 was within a space between record bit trains (which is about 20 nm), so that the recorded information could correctly be read. In the other blocks positions of tips of probes were deviated from the record bit positions written because of the temperature drift, so that reading was impossible. Then, reading positions of recorded bits were adjusted by independently displacing the nine blocks by the electrostatic force as to compensate the deviation amount caused by the temperature drift, which enabled correct reproduction of recorded information.

Another embodiment of the present invention will be next described.

The present embodiment has a similar arrangement to the preceding embodiment, in which the probe support plate is divided into blocks of 3×3 and each block is displaced by a piezo-electric force.

Figure 5:
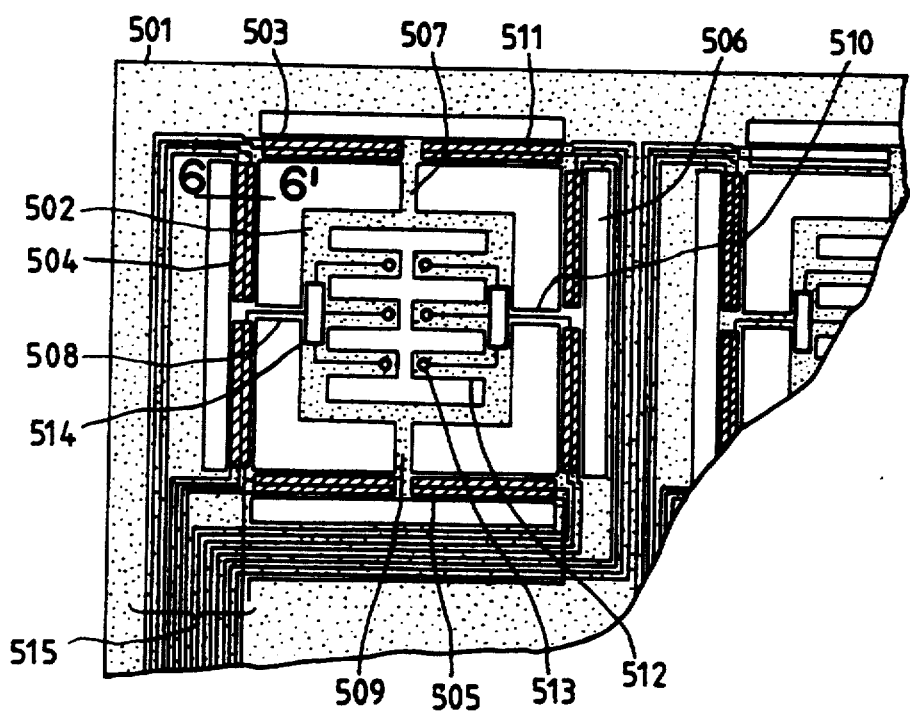
FIG. 5 is a fragmentary plan view to show another embodiment of the probe support plate as shown in FIG. 1.

FIG. 5 is a fragmentary plan view of a probe support plate used in the present embodiment.

Nine blocks in total arranged in a matrix of 3×3 are produced on a Si substrate 501 having a size of 1 cm × 1 cm, which are arranged to be capable of being two-dimensionally driven relative to the Si substrate 501. Among the blocks only one block 502 is shown in FIG. 5.

Each block is sized in 500 μm × 500 μm. The block 502 is supported by hinges 503, 504, 505, 506 surrounding the block 502 and by hinges 507, 508, 509, 510 formed to connect the block 502 with each central portion of hinge 503, 504, 505, 506. A segmental piezo-electric layer 511 is provided on each of the hinges 503, 504, 505, 506.

Cantilevers 512, probes for tunnel current detection 513, a multiplexer 514 and wiring 515 are substantially the same as the cantilevers 213, the probes for tunnel current detection 106, the multiplexer 108, and the wiring 216, respectively, in FIG. 1 or in FIG. 2 showing the prior embodiment.

Figure 6:
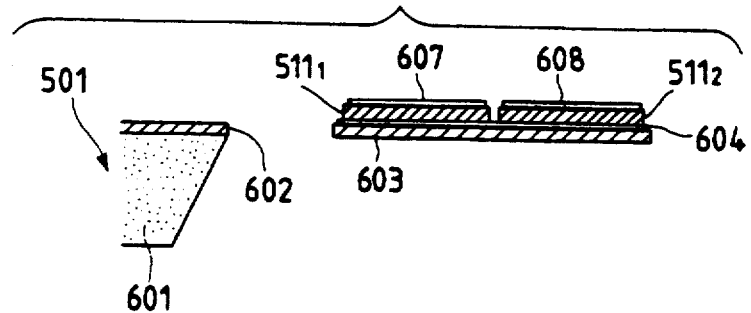
FIG. 6 is a cross sectional view along the 6—6' line in FIG. 5.

FIG. 6 is a cross sectional view along the line 6—6' in FIG. 5.

In FIG. 6 a SiN film 602 is formed on a Si wafer 601, forming the Si substrate 501. The Si wafer 601 is removed by etching in a portion of each hinge to leave only SiN film 603, and an electrode 604 is formed of Au film on the SiN film 603. Separate piezo-electric layers $511_1$, $511_2$ are formed of a ZnO film in thickness of 1 μm on the electrode 604 as the piezo-electric layer 511 as shown in FIG. 5. Electrodes 607, 608 are formed of Au film on the piezo-electric layers $511_1$, $511_2$, respectively. Applying electric fields different in sign between the electrodes 604 and 607 and between the electrodes 604 and 608, each of the hinges 503, 504, 505, 506 (see FIG. 5) is deformed. When a voltage of 0—10 V is applied, the block 502 is displaced in ±0.2 μm.

Using the same record medium as in the preceding embodiment, the writing of record bits was carried out at ambient temperature of 20° C. and the reading of recorded bits at ambient temperature of 22° C. Accurate recording and/or reproducing of information was conducted by independently controlling the blocks in the same manner as in the preceding embodiment.

Still another embodiment of the present invention will be next explained.

A probe plate employed in this embodiment is similar to those in the prior embodiments, and a record medium is such that Au is evaporated onto a Si wafer and four layers of polyimide LB film are formed in about 15 Å on the Au layer. The information recording and/or reproducing method is the same as in the prior embodiments.

Figure 7:
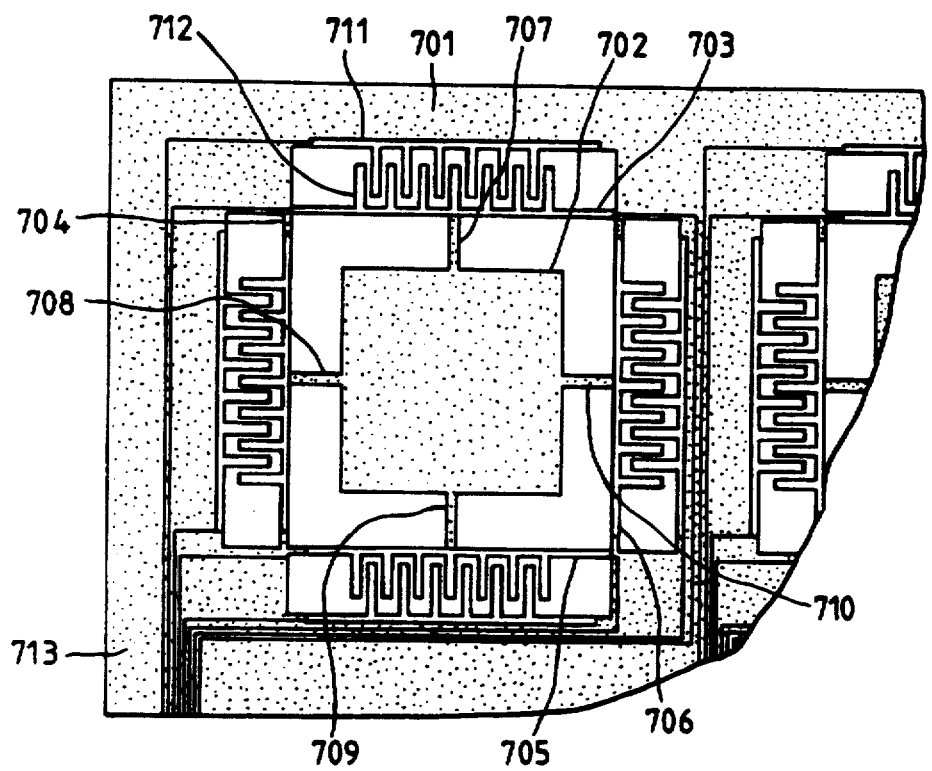
FIG. 7 is a fragmentary plane view to show another embodiment of the record medium as shown in FIG. 1.

FIG. 7 is a fragmentary plan view of the record medium used in the present embodiment.

Each construction and size of a Si substrate 701, a block 702 in which information is recorded, and hinges 703, 704, 705, 706, 707, 708, 709, 710 supporting the block 702 are the same as those of the Si substrate 201, the block 202 in which the probes for recording information are formed, and the hinges 203, 204, 205, 206, 207, 208, 209, 210 supporting the block 202, respectively, as shown in the prior embodiment.

A comb-shaped electrode 712 is formed on the hinge 703 by impurity doping and photolithography, and a similar comb-shaped electrode 711 is formed to oppose the comb-shaped electrode 712 on the Si substrate 201 side. Numeral 713 denotes a wiring portion. The same comb-shaped electrodes are formed on each of the hinges 704, 705, 706, which are omitted to denote for brevity of illustration.

A gap is approximately 1 μm between the above comb-shaped electrodes 711, 712, a size of comb is so defined as to form teeth each of 10 μm × 50 μm along a distance of 0.5 mm, and the number of comb pairs is 10–20. When a voltage of 0–50 V was applied between the comb-shaped electrodes 711 and 712, the hinges 703, 704, . . . were deformed, whereby the block 702 was displaced in ±0.3 μm.

Using the probe plate and the record medium as described, writing of record bits was carried out at ambient temperature of 20° C. and reading of recorded bits at ambient temperature of 30° C. Accurate information record and/or reproducing was effected in the same manner as in the prior embodiments by independently controlling the respective blocks on the probe side and on the record medium side.

Even though the temperature upon reading was higher in the present embodiment than that in the prior embodiments, accurate information reading was made in the same manner as in the prior embodiments. This result shows that the amount of thermal drift itself becomes decreased and an adjustable range is widened, because the substrates of probe and record medium both are of Si and because the probe plate and the record medium both are segmented in blocks. Thus, the apparatus may be used in a wider range of temperature.

Although the driving means is driven by the electrostatic force or by the piezo-electric force in the embodiments as described, the driving force is not limited to these, but may be selectively used depending upon a shape or an arrangement of recording and/or reproducing apparatus.

Although the above description concerns the case in which the control of the respective blocks are carried out in reading in the embodiments, the blocks may be controlled in either of writing and reading with a record medium in which record positions are predetermined, which would allow more accurate information record and/or reproduction.

As so arranged as described, the present invention may show the following advantages. (1) Moving the record medium or the probes in accordance with the thermal drift caused by thermal expansion, the influence of thermal drift may be reduced and a bit size of information record may be made smaller, achieving a record and/or reproduction apparatus with a high density and a large capacity. (2) Since the control is conducted for each block, a load on electric control system may be lighter, providing an inexpensive, reliable recording/reproducing apparatus. Also, sufficient dimensions may be secured for the portion which is displaced in the record medium plane, so that a recording and/or reproducing apparatus may be provided with a large operation margin and with high reliability and durability. (3) The probes, the record medium, and the substrates may be selected without taking the difference of thermal expansion into consideration, and therefore a material excellent in recording and reproducing properties may be used as the record medium, whereby a recording and/or reproducing apparatus may be provided with high reliability.

What is claimed is:

1. An information recording and/or reproducing apparatus which performs at least one of recording and reproduction of information on an information record medium with a plurality of probes, said apparatus comprising:
   a plurality of blocks each of which supports a plurality of probes;
   a support plate supporting said plurality of blocks; and
   driving means for driving said plurality of blocks independently of one another.

2. An information recording and/or reproducing apparatus according to claim 1, wherein each of said plurality of blocks supports a same number of probes as another block.

3. An information recording and/or reproducing apparatus according to claim 1, wherein each of said plurality of probes is supported by a cantilever in each of the blocks.

4. An information recording and/or reproducing apparatus according to claim 1, further comprising voltage applying means for applying a voltage between the plurality of probes and the record medium.

5. An information recording and/or reproducing apparatus according to claim 4, wherein at least one of recording and reproduction of information is carried out using a tunnel current generated between the plurality of probes and the record medium.

6. An information recording and/or reproducing apparatus which performs at least one of recording and reproduction of information on an information record medium with a plurality of probes, said apparatus comprising:
   an information record medium segmented into a plurality of blocks;
   a support plate supporting the plurality of probes; and driving means for driving said plurality of blocks independently of one another.

7. An information recording and/or reproducing apparatus which performs at least one of recording and reproduction of information on an information record medium with a plurality of probes, said apparatus comprising:

an information record medium segmented into a plurality of blocks;

a plurality of blocks each of which supports a plurality of probes;

a support plate supporting said plurality of blocks;

first driving means for driving the plurality of blocks of the information record medium independently of one another; and second driving means for driving the plurality of blocks of said support plate independently of one another.

* * * * *